United States Patent [19]
Stang

[11] 3,974,621
[45] Aug. 17, 1976

[54] WEDGE-BOLTED JOINT

[76] Inventor: Micheal O. Stang, 7757 Greenly Drive, Oakland, Calif. 94605

[22] Filed: Mar. 17, 1975

[21] Appl. No.: 559,329

[52] U.S. Cl. ................................ 52/758 F; 85/79; 403/2; 403/409; 403/388
[51] Int. Cl.² .......................................... F16B 5/00
[58] Field of Search ......... 85/5 E, 8.1, 5 M, DIG. 2, 85/72, 79; 403/2, 388, 408, 409; 52/758 F, 753 E, 753 G

[56] References Cited
UNITED STATES PATENTS

| | | | |
|---|---|---|---|
| 282,077 | 7/1883 | Hardin | 52/758 F |
| 1,695,113 | 12/1928 | Langton et al. | 85/8.1 X |
| 1,798,273 | 3/1931 | Pleister | 85/72 X |
| 2,238,463 | 4/1941 | Dubilier | 85/8.1 X |
| 2,748,594 | 6/1956 | Edwards | 85/79 |
| 3,513,509 | 5/1970 | Gross | 85/72 X |
| 3,608,938 | 9/1971 | Murdock | 52/758 F |

*Primary Examiner*—Wayne L. Shedd
*Attorney, Agent, or Firm*—Theodore J. Bielen, Jr.; Richard Esty Peterson

[57] ABSTRACT

A fastening device for the connection of two bodies having aligned openings therein utilizing two members having facing inclined surfaces and projections engaging the lip of an opening such that an impact force creates a wedging action resulting in firmly securing the two bodies.

8 Claims, 5 Drawing Figures

U.S. Patent  Aug. 17, 1976  3,974,621
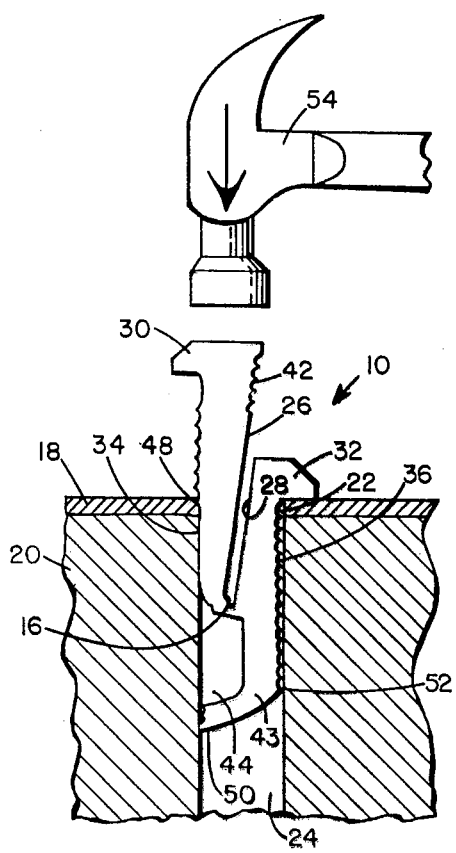
FIG. 1
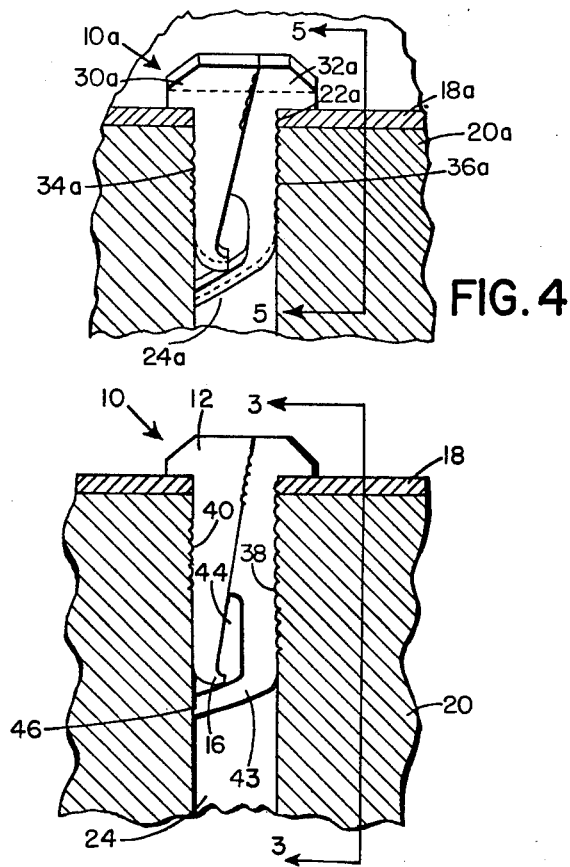
FIG. 4
FIG. 2
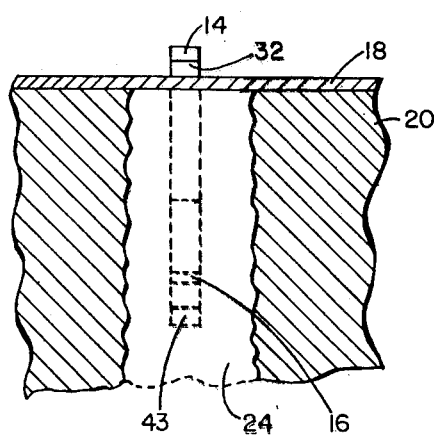
FIG. 3
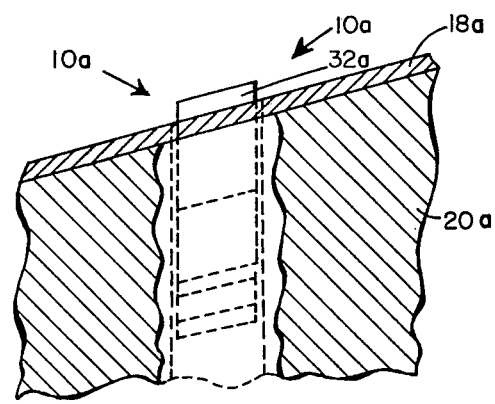
FIG. 5

WEDGE-BOLTED JOINT

BACKGROUND OF THE INVENTION

The present invention relates to a novel fastening device for use in holding one body to another and particularly useful in the construction of iron work.

The earliest fasteners, devised to solve the age old problem of connecting one body to another, includes screws, bolts and nuts, anchors, nails, spikes and the like. Since the advent of the inclined plane, the strain and force of a wedge as a fastener has been realized. However, it has been difficult to control the great forces produced by wedging action and the damage resulting from frictional engagement with the members to be fastened. Also, a simple wedge has a tendency to loosen with the lapse of time because of the reduction of the normal force of friction as a result of warping and deformation of the wedged members.

Previous devices have been partially successful but are not considered adaptable to a variety of applications.

SUMMARY OF THE INVENTION

In accordance with the present invention a fastening device is provided for the connection of a first body to a second body, both bodies having alignable openings, therein.

The device includes a first member having a projection such as a hook, nub, and the like which engages the first body and holds it against the lip of the opening in the second body. A second member, which may be detachably connected to said first member, likewise includes a projection for holding the first body against the lip of the opening in the second body. Both members have inclined surfaces that face one another. The administration of an impact force on at least one member causes the detachment of the members, when that embodiment is employed, and in any case causes the inclined surface to slide upon one another.

The sliding action between the inclined surfaces creates a spreading or wedging action on the walls of the openings. Thus, the members fit snugly within the opening and exert a force upon the surrounding walls. The projections firmly hold the first body to the second body.

Serrations may be placed on the member surfaces engaging the walls of the openings as well as a portion of the inclined surface.

Where the members are connected to form a unit, such unit may be conveniently placed within the openings by the user and positioned with one hand. The device will support itself on at least three points for the sake of stability. The connectable members may be constructed such that the connection part or neck of one member fits with a recess of the other member after imparting the impact force.

It is therefore an object of the present invention to provide a fastening device which will connect two bodies together quickly and easily.

It is another object of the present invention to provide a fastening device employing the wedging principle without incurring the disadvantages of a single wedge.

It is yet another object of the present invention to provide a fastening means to connect two bodies having alignable openings therebetween by utilizing a pair of members disposed in opposition with the openings and each member possessing an inclined surface that rides upon one another when an impact force is delivered to the members. The sliding of the inclined surfaces produces a wedging force which securly fixes the first body to the second body.

It is another object of the present invention to provide a fastening device useable in the construction of iron work such as railings and the like.

Another object of the present invention is to provide a fastener which may be mass produced by an extrusion process instead of casting.

Yet another object of the present invention is to produce a fastening device useable to fasten together two bodies at oblique angles as well as bodies positioned at right angles to the fastener.

The invention possesses other objects and advantages especially as concerns particular features and characteristics thereof, which will become apparent as the specification continues.

For a better understanding of the invention, reference is made to the following detailed description.

BRIEF DESCRIPTION OF THE DRAWINGS

FIG. 1 is a side sectional view of the device before application of the impart force.

FIG. 2 is a side sectional view of the device after application of the impact force.

FIG. 3 is a sectional view taken along line 3—3 of FIG. 2.

FIG. 4 is a side sectional view of the device after application of the impact force to two bodies affixed at an oblique angle.

FIG. 5 is a sectional view taken along line 5—5 of FIG. 3.

DESCRIPTION OF THE PREFERRED EMBODIMENTS

The fastening device as a whole is depicted in the drawings by reference character 10. The device includes a first member 12 and a second member 14. The members may be constructed separately but are shown in FIG. 1 as connected together by neck 16. The device 10 may be employed to fasten any bodies together but as depicted in the drawings, the device fixes body 18 to body 20. The bodies preferably include openings, such as opening 22 and opening 24, respectively associated with body 18 and body 20.

The openings 22 and 24 align, allowing at least portions of members 12 and 14 to position within the openings. The device 10 may also be shaped such that it provides its own openings upon impartation of an impact force. However, the preferred embodiment requires that aligned openings 22 and 24 be furnished by a suitable means known in the art.

The members 12 and 14 include inclined surfaces 26 and 28 that face one another and slide upon one another, which will be more fully described as a specification continues. The upper part of members 12 and 14 include projections 30 and 32 that hold a portion of the body 18 to the body 20. As may be seen from FIGS. 1 and 2, the undersurfaces of projections 30 and 32 are oriented approximately parallel to the surface of body 18. Where the surfaces 18a and 20a intersect the wall engaging surfaces 34a and 36a at oblique angles, the undersurfaces of projections 30a and 32a may be fashioned to complement such angle, resulting in the above described parallel disposition of projections 30 and 32 and body 18. This embodiment of the present invention, device 10a FIGS. 4 and 5, is particularly useful in the installation of railings and the like on stairways, ramps and similar areas.

The device 10, having detachably connected members 12 and 14, may be easily formed of aluminum by an extrusion process, as well as by casting; both familiar to persons skilled in the art.

As depicted by FIGS. 1 – 3, the device 10 fits snugly in openings 22 and 24 which are rectangular in cross-sectional configurations, since the surfaces 34 and 36 are rectangularly shaped. The surfaces 34 and 36 may be of a rounded shape to fit into round openings, or any other shape conforming to the configuration of the opening. For instance, openings 22a and 24a have a trapezoidal configuration, FIG. 5.

The surfaces 34 and 36 contain serrations to grip the walls of the openings 22 and 24 when the device 10 has been pounded into position, as shown by FIG. 2.

One of the inclined surfaces 26 and 28 also includes a serration 42 (depicted on surface 26 of the FIGS. 1 – 4) along a portion of the same. The serration 42 serves the purpose of fixing the inclined surfaces together during implacement of the device 10.

Member 14 includes an angularly disposed leg 43 forming a chamber or recess 44 between member 12 and the wall of opening 24. Recess 44 encloses neck 16 still attached to member 12 after detachment of the neck. Leg 43 has a serration 46 which grips the wall of opening 24 to reinforce holding force of the device 10 insuring a tight fit.

In operation (FIG. 1), the user places device 10 within the openings 22 and 24. The embodiment, having detachably connected members 12 and 14, will be supported in an upright position at points 48, 50 and 52. The stability of this support allows the user to impart the placement force with one hand. It should be noted that the upper portion of the surface 36 does not engage to the wall of opening 24 at this stage in the placement of device 10. Projection 32 aids in the support of device 10 within the openings 22 and 24.

A force imparting instrument such as hammer 54 pounds the device 10 into place within openings 22 and 24. The hammer 54 initially strikes member 12 but may strike both members at the terminus of the blow. When members 12 and 14 are attached, neck 16 breaks away and enters recess 44. The inclined surfaces 26 and 28 slide upon one another as member 12 moves downward into the openings 22 and 24. The surfaces 34 and 36 push against the walls of openings 22 and 24, and the previously spaced upper portion of the device 10 adjacent the lip of the opening 22 in body 18, wedges firmly against the walls of the openings 22. Thus, a wedging action has been created causing the device 10 to fit snugly within openings 22 and 24 to securely hold body 18 to body 20 using projections 30 and 32. Additional gripping action derives from serrations 38, 40, 42 and 46 which bite into the wall surfaces of openings 22 and 24.

With reference to the alternate embodiment depicted in FIGS. 4 and 5, similar wedging occurs in placing the device 10a.

The detachable connection of members 12 and 14 is preferable in the present invention and such connection saves approximately 50% in labor costs during the installation of railing systems and much expense in the manufacture of the device 10.

It has been found that a device 10, designed to fit in a 1.4 centimeter opening of a tubular metal rail piece, requires in excess of 725 kilograms of tensile force for subsequent removal.

While in the foregoing specification embodiments of the invention have been set forth in considerable detail for purposes of making a complete disclosure of the invention, it will be apparent to those of ordinary skill in the art that numerous changes may be made in such details without departing from the spirit and principles of the invention.

What is claimed is:

1. A fastening device to connect a first body to a second body, the first body having an opening alinged with an opening in the second body comprising:
   a. first member having a projection for holding a portion of the first body against the lip of the opening in the second body, said first member having an inclined surface;
   b. second member having a projection for holding a portion of the first body to the lip of the opening in the second body, said second member having an inclined surface; said inclinded surfaces of said first and second members facing one another, a portion of said unit, including portions of both members, positioned within the aligned openings such that an impact on said members causes said inclined surfaces to slide upon one another, said first and second members snugly fitting within said aligned openings with said projections firmly holding the first body to the second body, said first and second members detachably connected with a neck between said first and second members to form a unit and said impact causes said first and second members to detach;
   c. recess included in said second member to at least partially enclose said neck after detachment of said first and second members.

2. The fastening device of claim 1 in which one of the surfaces of said first member includes serrations for gripingly engaging the walls of the openings of the first and second bodies.

3. The fastening device of claim 2 in which one of the surfaces of said second member includes serrations for gripingly engaging the walls of the openings of the first and second bodies.

4. The fastening device of claim 3 in which one of said inclined surfaces of said first and second members includes serrations along a portion thereof such that said one of said sliding inclined surfaces gripingly engages a portion of the other said inclined surfaces after application of impact on said members.

5. The fastening device of claim 1 in which one of the surfaces of said unit includes serrations for gripingly engaging the walls of the openings of the first and second bodies.

6. The fastening device of claim 5 in which two of the surfaces of said unit includes serrations for gripingly engaging the walls of the openings of the first and second bodies.

7. The fastening device of claim 6 in which one of said inclined surfaces of said first and second members includes serrations along a portion thereof such that said one of said sliding inclined surfaces gripingly engages a portion of the other of said inclined surfaces after the application of impact on said members.

8. The fastening device of claim 1 in which said unit rests on at least three points on the walls and lip of the openings to preclude displacement of said unit partially within said openings prior to impact.

* * * * *